Figure 1:
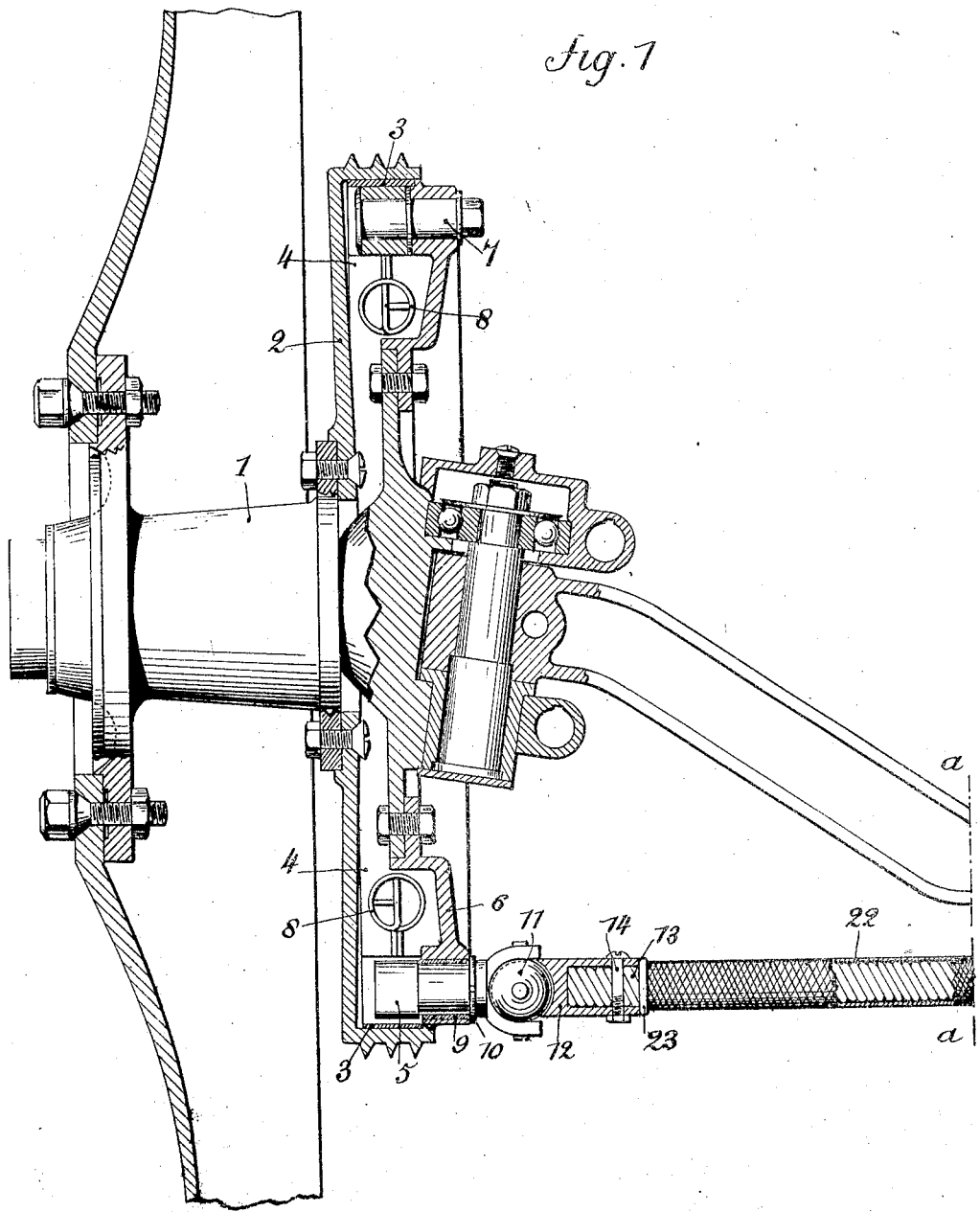

April 13, 1926.
L. HERSOT
1,580,785
BRAKE CONTROL DEVICE FOR FRONT WHEELS
Filed Jan. 30, 1922   2 Sheets-Sheet 2
fig. 1ª
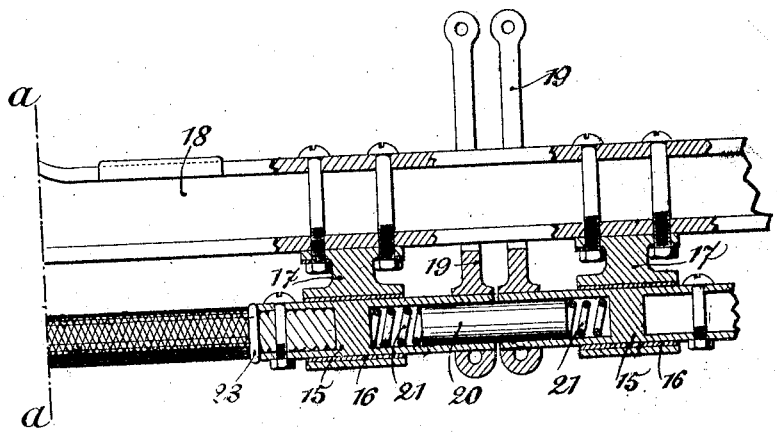
fig. 2
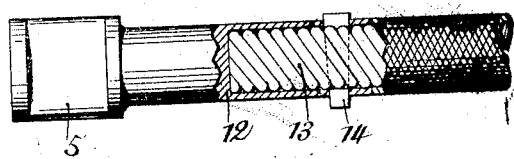
Inventor
Lucien Hersot
By Lawrence Langner
Atty

UNITED STATES PATENT OFFICE.

LUCIEN HERSOT, OF LIMOURS, FRANCE.

BRAKE-CONTROL DEVICE FOR FRONT WHEELS.

Application filed January 30, 1922. Serial No. 532,794.

*To all whom it may concern:*

Be it known that I, LUCIEN HERSOT, a citizen of the Republic of France, and residing at Limours, Seine-et-Oise Department, in the Republic of France, engineer, have invented certain new and useful Brake-Control Devices for Front Wheels, of which the following is a specification.

This invention relates to a brake control device for front wheels, for instance for motor vehicles, whereby the necessary pivot connections are simplified. To this effect, the cross bars respectively actuating the control cams are replaced by flexible cables having a sufficient elasticity to enable them to act in all positions of the wheel.

The accompanying drawing shows by way of example an embodiment of the invention, wherein:

Fig. 1 is a cross-section through the front wheel and the brake.

Fig. 1ª is a continuation of the showing of Figure 1, the lines a—a of Figures 1 and 1ª, matching.

Fig. 2 is a partial section of a modified form of construction.

1 indicates the wheel hub having mounted thereupon a brake drum 2. The said drum is preferably constructed of aluminium covered with a facing 3 at the part entering in friction contact with the brake shoes 4. The said shoes are actuated in the known manner by the rotation of a cam 5 revoluble on trunnions in a member 6 secured to the journal. The shoes 4 are pivoted to an axle 7 secured to the member 6 and are brought back by the springs 8. The cam 5 is revoluble in the member 6 in a bearing 9 and is laterally maintained by a thrust ring 10. The said cam is pivoted by the axle 11 to a connecting member 12 wherein is fitted the end of the metal cable 13, the latter being maintained by the pin 14. The other end of the cable 13 is maintained in like manner in a connecting member 15 which is slidable in a bearing 16 secured to a support 17 mounted on the vehicle axle 18.

Upon the said connecting member 15 is mounted a control lever 19. A like arrangement is employed for both sides, and the members 15 have cut-out portion wherein is slidable an axle 20 maintained by the springs 21. The levers 19 are actuated by the driver by means of a compensating bar device in order to provide for an equal braking action upon both wheels, and the said levers cause the cable 13 to rotate upon its axis. This movement will also effect the rotation of the cam 5, and the brakes are thus thrown on. The levers 19 are free to move in the transverse sense, and consequently in the slight movements made by the connecting member 12 occasioned by the steering of the wheels, there will be produced a deformation of the cable and a sliding movement of the member 15 in the support 17, thus enabling the control to be effected without jamming in all positions.

The slidable axle 20 will obviate all overhang position of the connecting members 15 in the event of a sudden and violent braking action, and no effort will be brought upon the bearings 16. The cable 13 is preferably inclosed in a flexible sheath 22 of leather or metal which is maintained by two collars 23 in such manner as to preserve the same from dust and mud. By reason of the flexibility of the cable 13, it will even be possible to dispense with the pivot portion 11, as shown in the modified form Fig. 2. In this case the cam 5 and the connecting member 12 are made in one piece and the work to be performed by the cable during turns on the road is somewhat greater. It is obvious that in all cases the cables should be constructed in such manner that the braking action will tend to increase the torsion of the same.

I claim—

1. In a brake control device for the front wheels of motor vehicles, the combination of a brake drum mounted upon the wheel, braking elements disposed within the said drum, a cam adapted to actuate these braking elements, a bearing-support adapted to be mounted upon the front axle, a revolving sleeve mounted so as to be able to slide in said supports, a control lever mounted upon one of the ends of said sleeve, a flexible cable the one end whereof is secured in the other end of said sleeve, the opposite end of said cable being connected with the said cam.

2. In a brake control device for the front wheels of motor vehicles, the combination of a brake drum mounted upon the wheel, braking elements disposed within the said drum, a cam adapted to actuate these braking elements, a universal joint secured to said cam, the center of this joint being placed at a distance from the pivoting axis of the wheel, a bearing support adapted to be fixed to the front axle, a revolving sleeve slidably mounted in the said bearing support, a control lever mounted upon one end of the said sleeve, a flexible cable, the one end whereof secured in the other end of said sleeve, the opposite end of said cable being attached to the said universal joint.

In testimony that I claim the foregoing as my invention, I have signed my name.

LUCIEN HERSOT.